United States Patent
Aurich et al.

(10) Patent No.: US 10,232,833 B2
(45) Date of Patent: Mar. 19, 2019

(54) METHOD FOR OPERATING A BRAKE CONTROL SYSTEM FOR A RAIL VEHICLE COMPRISING A BRAKE SYSTEM, BRAKE CONTROL SYSTEM, BRAKE SYSTEM, AND RAIL VEHICLE

(71) Applicant: KNORR-BREMSE SYSTEME FÜR SCHIENENFAHRZEUGE GMBH, Munich (DE)

(72) Inventors: Stefan Aurich, Friedberg (DE); Torsten Grunwald, Seehausen am Staffelsee (DE); Christof Zimmermann, Planegg (DE)

(73) Assignee: Knorr-Bremse System Fur Schienefahrzeuge GMBH, Munich (DE)

( * ) Notice: Subject to any disclaimer, the term of this patent is extended or adjusted under 35 U.S.C. 154(b) by 0 days.

(21) Appl. No.: 15/762,751

(22) PCT Filed: Sep. 20, 2016

(86) PCT No.: PCT/EP2016/072316
§ 371 (c)(1),
(2) Date: Mar. 23, 2018

(87) PCT Pub. No.: WO2017/050770
PCT Pub. Date: Mar. 30, 2017

(65) Prior Publication Data
US 2018/0273003 A1 Sep. 27, 2018

(30) Foreign Application Priority Data
Sep. 25, 2015 (DE) .................... 10 2015 116 208

(51) Int. Cl.
*G05D 1/00* (2006.01)
*G06F 17/00* (2006.01)
*G06F 19/00* (2018.01)
*G05D 3/00* (2006.01)
(Continued)

(52) U.S. Cl.
CPC .......... *B60T 8/1705* (2013.01); *B60T 13/662* (2013.01); *B60T 13/665* (2013.01); *B60T 17/228* (2013.01);
(Continued)

(58) Field of Classification Search
CPC ...... B60T 8/1705; B60T 8/3235; B60T 13/24; B60T 13/662; B60T 13/665; B60T 17/228; B61H 13/00
(Continued)

(56) References Cited

U.S. PATENT DOCUMENTS 8,972,144 B2  3/2015  Herden et al.
8,989,927 B2  3/2015  Herden et al.
(Continued)

FOREIGN PATENT DOCUMENTS

DE  102007006725 A1  8/2008
DE  102008032710 A1  1/2010
(Continued)

OTHER PUBLICATIONS

Search report for International Patent Application No. PCT/EP2016/072316; dated Nov. 22, 2016.

*Primary Examiner* — Mahmoud S Ismail
(74) *Attorney, Agent, or Firm* — Barnes & Thornburg LLP

(57) ABSTRACT

A method for the operation of a brake control system for a rail vehicle that includes a brake system that has at least partially one friction brake, includes determining at least one characteristic curve using at least one virtual and/or at least one actual reference braking journey of the rail vehicle, which characteristic curve sets at least one control variable for maintaining at least one performance variable in relation to one another, recording the characteristic curve in the brake control system; and using the characteristic curve functioning as a basis for controlling the brake system of the rail vehicle. Furthermore, a brake control system, a brake system, and a rail vehicle are provided.

8 Claims, 1 Drawing Sheet

(51) Int. Cl.
*B60T 8/17* (2006.01)
*B60T 13/66* (2006.01)
*B60T 17/22* (2006.01)
*B61H 13/00* (2006.01)
*G06F 7/00* (2006.01)
*G01L 5/28* (2006.01)
*B60T 8/32* (2006.01)
*B60T 13/24* (2006.01)

(52) U.S. Cl.
CPC ............ *B61H 13/00* (2013.01); *B60T 8/3235* (2013.01); *B60T 13/24* (2013.01); *B60T 2270/86* (2013.01)

(58) Field of Classification Search
USPC ........................................ 701/20, 54; 73/121
See application file for complete search history.

(56) References Cited

U.S. PATENT DOCUMENTS

| | | | |
|---|---|---|---|
| 2009/0255329 A1* | 10/2009 | Connell | B60T 17/228 73/121 |
| 2012/0192757 A1 | 8/2012 | Schiffers et al. | |
| 2015/0239454 A1* | 8/2015 | Sujan | F02D 41/1401 701/54 |

FOREIGN PATENT DOCUMENTS

| | | |
|---|---|---|
| DE | 102009042965 A1 | 3/2011 |
| DE | 102010049303 A1 | 4/2012 |
| DE | 1020100053683 A1 | 6/2012 |
| DE | 102012219984 A1 | 4/2014 |
| EP | 2890596 A1 | 7/2015 |

* cited by examiner

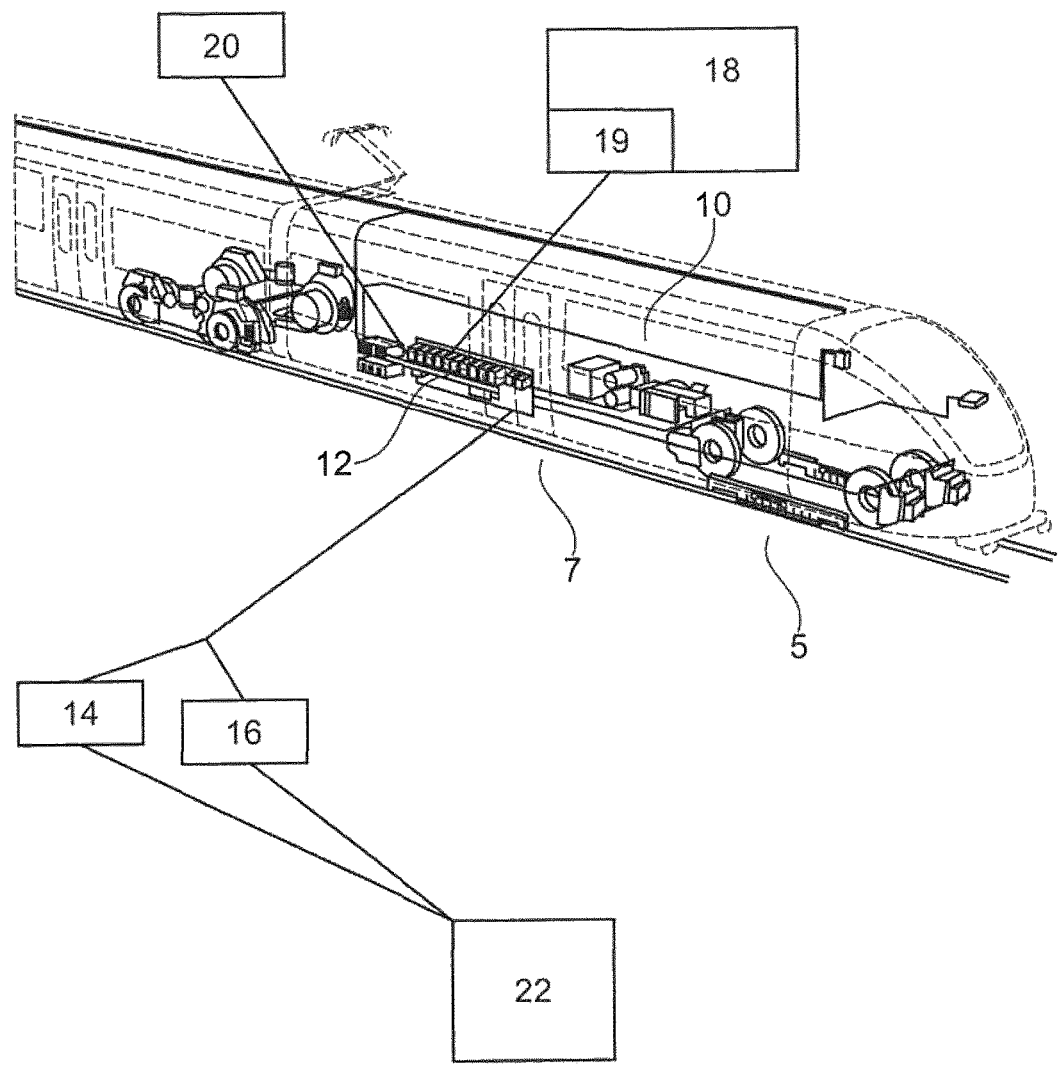

METHOD FOR OPERATING A BRAKE CONTROL SYSTEM FOR A RAIL VEHICLE COMPRISING A BRAKE SYSTEM, BRAKE CONTROL SYSTEM, BRAKE SYSTEM, AND RAIL VEHICLE

CROSS-REFERENCE AND PRIORITY CLAIM

This patent application is a U.S. National Phase of International Patent Application No. PCT/EP2016/072316, filed Sep. 20, 2016, which claims priority to German Patent Application No. 10 2015 116 208.3, filed Sep. 25, 2015, the disclosures of which are incorporated herein by reference in their entirety.

SUMMARY

Disclosed embodiments relate to a method for operating a brake control system for a rail vehicle having a brake system, a brake control system, a brake system, and also a rail vehicle.

Vehicles, such as rail vehicles that use controlled brake systems are subject to the influence of tolerances and load-dependent fluctuations in parameters.

BRIEF DESCRIPTION OF THE FIGURES

Further details and advantages of the disclosed embodiments are further explained below with reference to an exemplary embodiment illustrated in the drawings.

The single FIGURE illustrates schematically an exemplary embodiment of the brake control system in accordance with the disclosed embodiments in a brake system of a rail vehicle, with which the method may be implemented.

DETAILED DESCRIPTION

The coefficient of dynamic brake lining friction is dependent upon the load state, the input temperature and other energy-related influences. In general, it is necessary for this purpose to perform multiple braking tests using the vehicle on a suitable and closed-off testing area until the correct parameter set and also the correct setting point of the mechanical brake are found in an iterative manner A substantial proportion of the functions in modern vehicles is controlled electronically. Within the scope of determining the setting procedure and the parameter set in an iterative manner, considerable effort and a large outlay are required in order to verify, to validate and where appropriate to certify (depending upon the jurisdiction of the regulatory body and their requirements) the respective changes for a new iteration step prior to recording the tests. As a result of this, conventionally, there is always the problem of uncertainty with regards to costs and timing.

DE 10 2010 049 303 A1 discloses a method for controlling an anti-slip-controlled friction brake system of a rail vehicle. A brake slip of an axle of a rail vehicle is identified if a brake slip that exceeds a predetermined measurement occurs during a braking procedure and it is therefore necessary to activate the anti-slip-regulating procedure and the braking effort that is lost as a result of the axle with brake slip is calculated by means of a control device in order to compensate for the lost braking effort by means of at least in part increasing the braking pressure.

DE 10 2010 053 683 A1 discloses a method for controlling an anti-slip-controlled friction brake system of a rail vehicle in which the friction braking forces are adjusted at an axle with brake slip and namely in such a manner that by means of at least in part compensating for the friction braking force that is lost owing to the inadmissible brake slip at the at least one axle by means of this adaptation a deviation of the actual deceleration of the rail vehicle or the rail vehicle train from a desired braking deceleration that is predetermined by means of the emergency braking request may be maintained within a tolerable range.

Moreover, DE 10 2009 042 965 A1 discloses a brake system having an intelligent actuator for braking a rail-borne vehicle. The brake system comprises a control connection that is connected via a data line to the brake controller in order to receive the control signals, wherein the control connection is connected to a logic unit of the actuator, the logic unit being configured to set the braking force in dependence upon the control signals.

Moreover, DE 10 2012 219 984 A1 discloses a brake actuator for a brake system of a vehicle, in particular a rail vehicle. In order to improve the controllability of the brake actuator, a desired value control device is provided that in the case of predetermined operating conditions of the vehicle, in order to control the compression variable, sets the desired output value for the brake system in such a manner that the ascertained actual value of the compression variable corresponds to a desired value of the compression variable. However, an approach of this type is associated with a complex control procedure that increases the complexity and therefore also the costs of the system.

Thus, disclosed embodiments are directed to providing a simple but reliably constructed brake control system and a corresponding method. Disclosed embodiments may further develop in an advantageous manner a method, a friction brake system and also a rail vehicle of the type mentioned in the introduction, in particular with the result that it is simpler to validate and certify a rail vehicle and it is possible to better plan the validation procedure and certification procedure and as a consequence to also save costs and time.

In accordance with disclosed embodiments, a method is provided for operating a brake control system for a rail vehicle having a brake system, wherein the brake system comprises at least as a component a friction brake, the method having at least the following steps: determining at least one characteristic curve by means of at least one virtual and/or at least one real reference braking journey of the rail vehicle, the characteristic curve correlating at least one control variable for maintaining at least one performance variable; storing the characteristic curve in the brake control system; and using the characteristic curve as a basis for actuating the brake system of the rail vehicle.

Disclosed embodiments are based on the fundamental principle that an efficient solution is provided for the problem of finding a parameter set. A system is installed in the rail vehicle and the system comprises at least one sensor for ascertaining acceleration, braking travel and/or velocity, and during the braking test paths the system sets the parameters of the brake controller in such a manner that the behavior of the brake system corresponds to the requirements. The control variables that are recorded in this step, in other words variables that may be controlled by means of the brake control system in order to maintain the performance variables, in other words variables that occur on the basis of the operating state of the rail vehicle and that can only be indirectly influenced by means of the brake control system, are saved and stored as a characteristic curve in the brake controller and/or vehicle controller.

After the commissioning of the vehicle has been completed, there is consequently at least one characteristic curve available that is evaluated by means of the brake controller as a basis for actuating the braking force and is used so as to control the brake system.

The procedure of determining in an iterative manner the best-suited parameter set for complying with the normative requirements may therefore be omitted using this method. Generally, it is only necessary to perform the official acceptance run to officially verify compliance with the normative requirements.

The characteristic curves may be used both as an algorithm in the application software (generally of the operating brake) as well as as a fixed characteristic curve in a stored programmable controller for the use of a reliable emergency brake or rapid-acting brake.

The term "reference braking journey" may include a static and/or dynamic operation of a brake system, a test journey or also multiple test journeys.

The term "control variable" and also the term "performance variable" is further in particular to be understood as describing or characterizing a relevant variable that for example describes the brake system or parts of the brake system or the behavior of the brake system or is characteristic of the brake system.

The rail vehicle may be a railcar or a train with driving units and coaches, a combination having at least one locomotive and one or multiple carriages/wagons, a high-speed train or the like.

Furthermore, it may be provided that the at least one control variable describes force and/or pressure and/or current and/or time.

The force may be the braking force that is to be provided by means of the brake system.

The pressure may be the pressure that prevails at the pneumatic and/or hydraulic components of the brake system.

The current may be by way of example the current that is prevailing in the brake system for the control procedure.

The time may be the time that the brake system is actuated in order to achieve the desired braking effect.

Furthermore, it may be provided that the at least one performance variable describes braking travel and/or deceleration and/or acceleration and/or traction wheel to rail and/or reaction time. These performance variables are each in their own right characteristic of the performance capability and the operating state of the brake system and therefore in each case are well suited in their own right to going into the characteristic curve as variables.

Furthermore, it is conceivable that multiple characteristic curves are provided that provide a multidimensional performance map. As a consequence, it is possible to describe multidimensional correlations. A more precise description of the brake system is consequently possible. This also results in an improved accuracy of the control procedure of the brake system.

Furthermore, disclosed embodiments relate to a brake control system for a rail vehicle having a brake system, wherein the brake system comprises at least as a component a friction brake, the brake system having at least one control unit, wherein the control unit comprises at least one data input interface and at least one data output interface and also at least one control data set storage device, and having at least one sensor, wherein control variables and/or performance variables may be determined at least in part by means of the sensor, wherein the brake control system further comprises at least one computing unit, wherein by means of the computing unit by means of at least one virtual and/or at least one real reference braking journey of the rail vehicle it may be possible to determine at least one characteristic curve that correlates at least one control variable for maintaining at least one performance variable, wherein by means of the control unit via the data input interface it may be possible to store the characteristic curve in the control data set storage device and wherein by means of the characteristic curve it may be possible to actuate the brake system by means of the control unit via the data output interface in such a manner that the characteristic curve is used as a basis for actuating the brake system of the rail vehicle.

All the structural and functional features and advantages that are described above in conjunction with the method for operating a brake control system for a rail vehicle having a brake system may likewise be realized in conjunction with the brake control system and may be achieved individually and/or in combination.

Furthermore, it may be provided that the at least one control variable describes force and/or pressure and/or current and/or time.

It is possible that the at least one performance variable describes braking travel and/or deceleration and/or acceleration and/or traction wheel to rail and/or reaction time.

Moreover, it is conceivable that multiple characteristic curves are provided that provide a multidimensional performance map.

It is conceivable that characteristic curves may be used both as an algorithm in the application software (generally the software of the operating brake) as well as as a fixed characteristic curve in a stored programmable controller for the use of a reliable emergency brake or rapid-acting brake.

Furthermore, the disclosed embodiments relate to a brake system, wherein the brake system comprises at least as a component a friction brake having at least one brake control system.

Furthermore, the disclosed embodiments relate to a rail vehicle.

FIG. 1 illustrates schematically a rail vehicle 5 in accordance with disclosed embodiments having a brake system 7. Furthermore, FIG. 1 illustrates schematically an exemplary embodiment of the brake control system 10 in accordance with the disclosed embodiments for a brake system 7, with which the method may be implemented.

The brake system 7 in the described exemplary embodiment is a pneumatic brake system of the rail vehicle 5 and comprises as a component a friction brake.

The brake control system 10 comprises a control unit 12, wherein the control unit 12 comprises at least one data input interface 14 and at least one data output interface 16 and also at least one control data set storage device 18 for control data sets. The characteristic curve 19 or the characteristic curves 19 is or are stored in the control data set storage device 18.

Moreover, sensors 20 for ascertaining control variables and performance variables of the brake system 10 are provided for example in a reference operation.

The sensors 20 are sensors that are suitable for ascertaining operating parameters such as: friction values such as for example brake lining/brake disk, wheel/rail; vehicle weight; braking force; highest velocity; and braking force distribution.

Furthermore, a computing unit 22 is provided that in the illustrated exemplary embodiment is an integral component of the brake control system 10.

The function of the brake control system or the method is as follows:

In the case of the method in accordance with the disclosed embodiments, the method being implemented by means of the brake control system 10 for a rail vehicle 5 having a brake system 7, initially at least one characteristic curve is determined by means of at least one virtual and/or at least one real reference braking journey of the rail vehicle 5, the characteristic curve correlating at least one control variable for maintaining at least one performance variable.

The control variables describe in particular force, pressure, current and time. The performance variables describe in particular braking travel, deceleration, acceleration, traction wheel to rail and reaction time.

Within the scope of the reference braking journey of the rail vehicle 5, parameters are (also) determined such as by way of example relating to: braking travel; air consumption; response behavior anti-slip; response time brake; and filling times Further parameters or performance variables may be used in the preparation of the characteristic curve(s). These technical parameters include but are not limited to: friction values such as for example brake lining/brake disk, wheel/rail; vehicle weight; braking force; highest velocity; braking force distribution; response behavior on a component basis; control device algorithms; and further parameters may be optionally determined.

These further parameters include but are not limited to: container sizes, pipeline diameters, pipeline lengths, and drop in pressure in lines, loss in friction.

The term "reference braking journey" may also comprise sections in which a normal driving operation takes place or in which high-speed journeys or slow journeys or situations such as an emergency braking procedure and entering a train station are simulated.

The characteristic curve 19 that is calculated by means of the computing unit 22 is stored in the brake control system 10. For this purpose, the characteristic curve is saved in the control data set storage device 18 via the data input interface 14.

The characteristic curve 19 is used as a basis for actuating the brake system 7 of the rail vehicle.

Fundamentally, multiple characteristic curves may be provided that provide a multidimensional performance map.

The characteristic curves 19 may be used both as an algorithm in the application software (generally of the operating brake) as well as as a fixed characteristic curve 19 in a stored programmable controller for the use of a reliable emergency brake or rapid-acting brake.

It is possible by virtue of controlling the brake system 7 on the basis of the characteristic curve by means of the brake control system 10 to store at least the respective control variables of each relevant operating state of the rail vehicle 5, the control variables being necessary for the desired performance variables.

As a consequence, it is rendered possible to control the brake system 7 of the rail vehicle 5 in a simple and reliable manner

LIST OF REFERENCE NUMERALS

5 Rail vehicle
7 Brake system
10 Brake control system
12 Control unit
14 Data input interface
16 Data output interface
18 Control data set storage device
19 Characteristic curve
20 Sensor
22 Computing unit

The invention claimed is:

1. A method for operating a brake control system for a rail vehicle having a brake system, wherein the brake system comprises a friction brake, the method comprising:
   determining at least one characteristic curve using at least one virtual and/or at least one real reference braking journey of the rail vehicle, the characteristic curve correlating at least one control variable for maintaining at least one performance variable;
   storing the characteristic curve in the brake control system; and
   using the characteristic curve as a basis for actuating the brake system of the rail vehicle,
   wherein multiple characteristic curves are provided that collectively provide a multidimensional performance map, and
   wherein the multiple characteristic curves are used as an algorithm in the controlling of an operating brake of the brake system and as a fixed characteristic curve in controlling an emergency brake of the brake system.

2. The method of claim 1, wherein the at least one control variable describes force and/or pressure and/or current and/or time.

3. The method of claim 1, wherein the at least one performance variable describes braking travel and/or deceleration and/or acceleration and/or traction wheel to rail and/or reaction time.

4. A brake control system for a rail vehicle having a brake system, wherein the brake system includes a component a friction brake and the brake control system comprises:
   at least one control unit that includes at least one data input interface, at least one data output interface, at least one control data set storage device, and at least one sensor, wherein control variables and/or performance variables are determined at least in part by the sensor;
   at least one computing unit determines at least one characteristic curve that correlates at least one control variable for maintaining at least one performance variable based on at least one virtual and/or at least one real reference braking journey of the rail vehicle, wherein the control unit, via the data input interface, stores the characteristic curve in the control data set storage device and the characteristic curve is used to actuate the brake system by the control unit, via the data output interface, such that the characteristic curve is used as a basis for actuating the brake system of the rail vehicle,
   wherein multiple characteristic curves are provided that collectively provide a multidimensional performance map, and
   wherein the multiple characteristic curves are used as an algorithm in the controlling of an operating brake of the brake system and as a fixed characteristic curve in controlling an emergency brake of the brake system.

5. The brake control system of claim 4, wherein the at least one control variable describes force and/or pressure and/or current and/or time.

6. The brake control system of claim 4 wherein the at least one performance variable describes braking travel and/or deceleration and/or acceleration and/or traction wheel to rail and/or reaction time.

7. A brake system comprising:
   a friction brake having at least one brake control system that comprises:
   at least one control unit that includes at least one data input interface, at least one data output interface, at least one control data set storage device, and at least one sensor, wherein control variables and/or performance variable are determined at least in part by the sensor;

at least one computing unit determines at least one characteristic curve that correlates at least one control variable for maintaining at least one performance variable based on at least one virtual and/or at least one real reference braking journey of a rail vehicle, wherein the control unit, via the data input interface, stores the characteristic curve in the control data set storage device and the characteristic curve is used to actuate the brake system by the control unit, via the data output interface, such that the characteristic curve is used as a basis for actuating the brake system of the rail vehicle, wherein multiple characteristic curves are provided that collectively provide a multidimensional performance map, and wherein the multiple characteristic curves are used as an algorithm in the controlling of a friction brake of the brake system and as a fixed characteristic curve in controlling an emergency brake of the brake system.

8. A rail vehicle comprising a brake system including a friction brake having at least one brake control system that comprises:

at least one control unit that includes at least one data input interface, at least one data output interface, at least one control data set storage device, and at least one sensor, wherein control variables and/or performance variable are determined at least in part by the sensor;

at least one computing unit determines at least one characteristic curve that correlates at least one control variable for maintaining at least one performance variable based on at least one virtual and/or at least one real reference braking journey of the rail vehicle, wherein the control unit, via the data input interface, stores the characteristic curve in the control data set storage device and the characteristic curve is used to actuate the brake system by the control unit, via the data output interface, such that the characteristic curve is used as a basis for actuating the brake system of the rail vehicle, wherein multiple characteristic curves are provided that collectively provide a multidimensional performance map, and wherein the multiple characteristic curves are used as an algorithm in the controlling of an operating brake of the brake system and as a fixed characteristic curve in controlling an emergency brake of the brake system.

* * * * *